Figure 1:
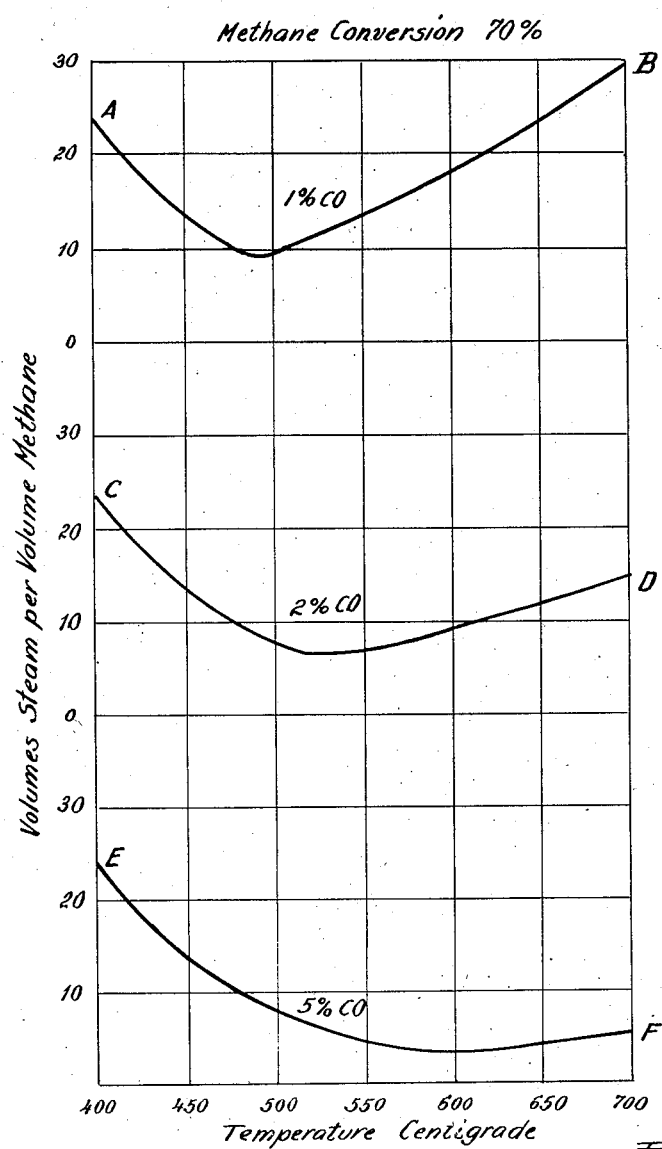

May 14, 1929.                    F. C. BLAKE                    1,713,325
                          METHOD OF PRODUCING HYDROGEN
                          Filed June 23, 1927        3 Sheets-Sheet 1

Inventor
Frank C. Blake, Deceased
Roberta L. Blake, Administratrix
BY
ATTORNEYS

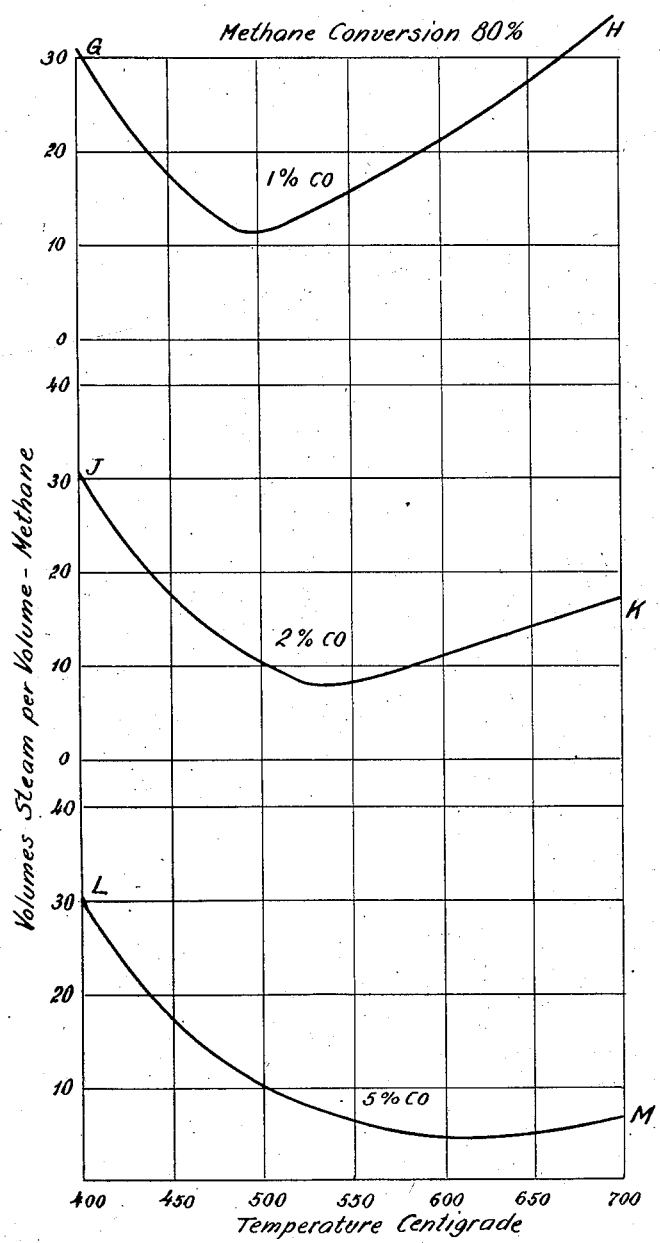

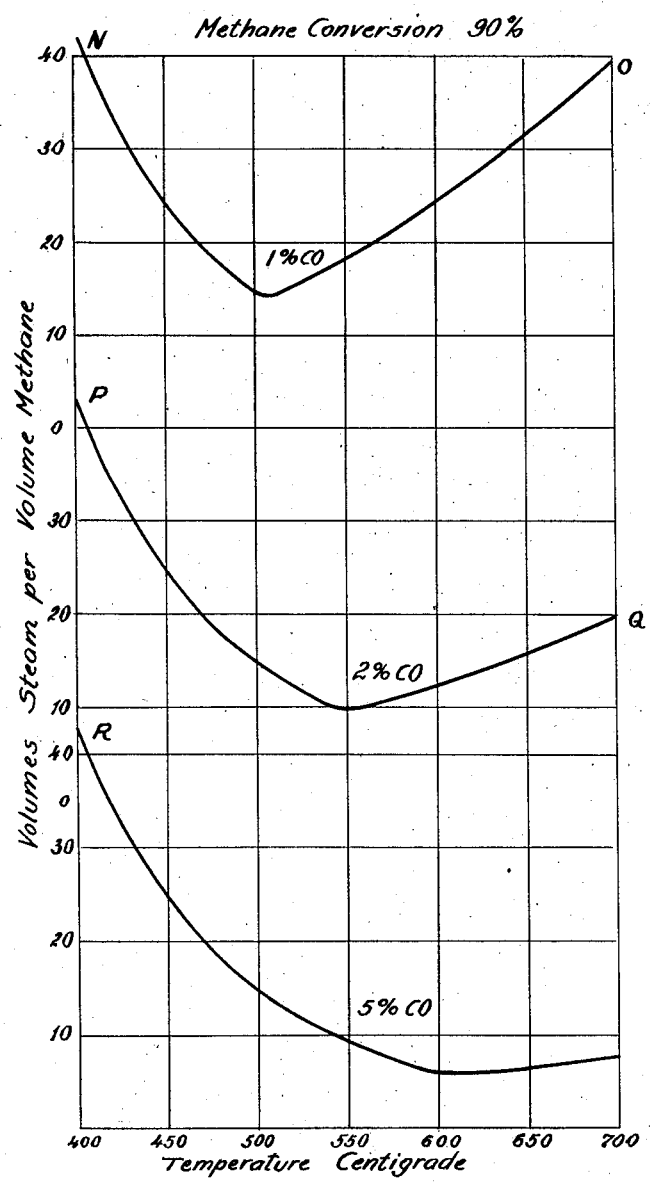

Patented May 14, 1929.

1,713,325

UNITED STATES PATENT OFFICE.

FRANK C. BLAKE, DECEASED, LATE OF WILMINGTON, DELAWARE, BY ROBERTA L. BLAKE, ADMINISTRATRIX, OF WILMINGTON, DELAWARE, ASSIGNOR TO LAZOTE INC., OF WILMINGTON, DELAWARE, A CORPORATION OF DELAWARE.

METHOD OF PRODUCING HYDROGEN.

Application filed June 23, 1927. Serial No. 200,951.

This invention relates to the manufacture of hydrogen by the catalytic reaction of steam and hydrocarbons such as methane.

It is known that hydrogen may be produced by the catalytic reaction of steam and hydrocarbons. Thus, methane reacts with steam in accordance with the following equations:

$$CH_4 + H_2O = CO + 3H_2$$
$$CH_4 + 2H_2O = CO_2 + 4H_2$$

At temperatures above 700° C. the first of these appears to be the principal reaction while at lower temperatures the second tends to predominate. Pure nickel may be used as the catalyst for the first reaction at temperatures above 700° C. but at lower temperatures its activity is so slight as to make it an unsatisfactory catalyst for the second reaction. However, in the copending application of Roger Williams, Serial No. 118,600, it is shown that hydrogen relatively free from carbon monoxide may be produced in accordance with the second of the above reactions at temperatures below 550° C. in the presence of a suitably promoted nickel catalyst such as, for example, nickel chromate or nickel promoted with ceria and alumina.

It is the object of the present invention to provide an improved process for the manufacture of hydrogen, and particularly for the manufacture of hydrogen of relatively low carbon monoxide content, the process being characterized by certain conditions which have been found to lead to great economies in practical operation.

Other objects and advantages will be apparent as the invention is better understood by reference to the following specification in which its preferred embodiments are described.

In carrying out the practical manufacture of hydrogen by the catalytic conversion of steam and methane, or the like, there are certain considerations of primary importance. First, it is desirable that as high a conversion of the methane be effected as is compatible with the other requirements to be met. This needs no explanation, since it will be evident that even though the methane be derived from a relatively cheap and abundant raw material, such as coke-oven gas or natural gas, the cost of the methane will be considerable and its most efficient utilization should be effected. Furthermore, the lower the conversion of methane, the higher will be the concentration thereof in the hydrogen produced. The removal of methane from hydrogen is relatively difficult on account of the comparative inertness of methane but in spite of that inertness its presence in hydrogen in large proportions is objectionable. For, if the hydrogen is to be used in high temperature catalytic reactions; the methane may decompose, and carburize the catalyst, and also, the diluting effect of the methane may seriously interfere with the progress of the reaction. For these reasons it is desirable to limit the concentration of methane in the hydrogen produced, and it has been found that in general for the most satisfactory results the conversion of methane should be about seventy per cent or more.

Secondly, the proportion of carbon monoxide in the hydrogen produced is of great significance, particularly in case the hydrogen is to be employed in catalytic reactions such as the synthesis of ammonia where carbon monoxide acts as a catalytic poison. Although carbon monoxide can be removed from hydrogen by various known methods, such as absorption in ammoniacal cuprous chloride and the like, the requirements of apparatus and materials for this purpose represent a considerable item of expense, especially where large volumes of gas are handled. In many instances it is desirable, therefore, to produce hydrogen containing relatively small proportions of carbon monoxide.

A third important consideration is the temperature at which the reaction is carried out. This will vary, of course, depending upon the activity of the catalyst used, the purity of the methane, the type of apparatus available, and other conditions. It may be said, however, that the temperature must not be too low for the catalyst to function properly, nor should it be too high, on account of the danger of overheating the catalyst; because of increased heat losses through radiation; and particularly in view of the amount of heat exchange required for preheating the incoming gases, which is at best large on account of the endothermic nature of the reaction.

Now, whereas the prior art gives no indication that the efficiency of the methane-steam conversion reaction for hydrogen production is at all affected by the proportions of steam to methane used, it has been found that in the practical operation of the process the steam-methane ratio is of major importance in determining the nature of the results obtained in that for a given temperature the ratio of steam to methane is the determining factor upon which both the per cent conversion of methane and the carbon monoxide content of the products depend.

More specifically it has been found that when working to obtain a given conversion of methane of about seventy per cent or more and a gaseous product of a maximum carbon monoxide content of about five per cent (dry basis) or less, there is a preferred operating temperature at which the steam requirement is a minimum.

Further, it has been found that when operating at any particular temperature within the range of about 400° to about 700° C. to obtain a methane conversion of about seventy per cent or more, there is a minimum steam-methane ratio required for a given maximum specification of carbon monoxide in the gaseous product.

In accordance with the foregoing the steam-methane conversion is effected at substantially the temperature corresponding to the minimum steam-methane ratio required for the desired per cent conversion of methane and the maximum carbon monoxide content of the gaseous products. Or, alternatively, if for any reason it is desired to operate at a temperature other than the temperature corresponding to the minimum steam requirement, such amounts of steam are employed as will be at least equal to the minimum for that temperature.

The preferred conditions of operation will be more specifically understood by reference to the accompanying drawings, in which Figs. 1, 2 and 3 are graphical representations of the minimum steam requirements to obtain a gaseous product containing various maxima of carbon monoxide with a methane conversion of about 70%, 80% and 90% respectively, at various temperatures within the range of 400° to 700° C.

Referring to Fig. 1, curve AB shows the minimum steam requirement to obtain a gaseous product containing at a maximum about 1% carbon monoxide (dry basis) with a methane conversion of about 70% at various temperatures within the range of 400°–700° C.; and Curve CD covers corresponding conditions for producing a gaseous product containing a maximum of about 2% of carbon monoxide; and Curve EF covers corresponding conditions for obtaining a gaseous product containing a maximum of about 5% of carbon monoxide.

Thus, it will be seen that if the conversion of methane is to be at least 70% and the product is to contain no more than about 1% of carbon monoxide, the steam requirement will be at the minimum, i. e., about 9 volumes per volume of methane, at about 475° C. Moreover, as to any other given temperature within the range of 400° to 700° C. the required volume ratio of steam to methane will vary from about 9 to about 29; being, for example, at 400° about 23; at 500° about 9.5; at 600° about 18 and at 700° about 29.

Similarly, if it is desired to obtain a product containing no more than about 2% carbon monoxide with a methane conversion of about 70%, the steam-methane volume ratio required will be lowest, i. e., about 6.5 at about 525° C. As to any other particular temperature within the range of 400° to 700° C. the steam requirement varies from about 6.5 volumes per volume of methane to about 23 volumes; being at 400° about 23 volumes, at 500° about 8 volumes, at 600° about 9 volumes, and at 700° about 15 volumes.

If the carbon monoxide content is to be more than 5% with a conversion of methane of about 70%, the steam requirement will be lowest, i. e., about 3.5 volumes per volume of methane, at about 600° C. At other temperatures of from 400° to 700° C. the volumes of steam required per volume of methane will vary from about 3.5 to about 23; the value at 400° being about 23, at 500° about 8, at 550° about 4.5 and at 700° about 5.5.

Figure 2 is similar to Figure 1, being a graphical representation of the same variables with a methane conversion of about 80%. From the curve GH it will be seen that when working to obtain an 80% conversion of methane and a gaseous product containing no more than about 1% of carbon monoxide, the steam requirement is a minimum (about 11 volumes) at about 495° C.; if the carbon monoxide maximum is about 2%, then (see curve JK) the steam requirement is at a minimum (about 8 volumes) at about 535° C., if the carbon monoxide maximum is about 5% (see curve LM) the steam requirement minimum is about 4 volumes at about 610° C.

Corresponding data for a methane conversion of about 90% are represented graphically in Fig. 3, comprising curves NO, PQ and RS. Under these conditions, when the maximum carbon monoxide in the gaseous product is about 1% (curve NO) the steam requirement is lowest (about 14 volumes) at about 508° C.; for 2% of carbon monoxide (curve PQ) the minimum steam value is at about 550° C., being about 10 volumes; for 5% of carbon monoxide (curve RS) the minimum steam value is about 6 volumes, corresponding to about 610° C.

The process may be carried out in any suitable apparatus which may include, for example, a converter in which a catalytic body is disposed and means for bringing the gases to reaction temperature, for which purpose one or more preheaters and heat exchangers are usually employed to warm the incoming gases first by heat from an external source and then at the expense of the hot products of the reaction. Any suitable catalyst may be used but preferably one of those described in the copending application of Roger Williams hereinbefore referred to. The catalyst may, for instance, be a nickel-ceria-alumina catalyst prepared as follows:

Crush pumice stone and screen to 8—14 mesh. Wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C. until the nitrogen oxides have been expelled. Place the product in the converter to be used in hydrogen production and heat for one hour in a stream of pure hydrogen at 400° C. and then supply a mixture of about 10 volumes of steam per volume of methane, previously freed from contact poisons, by passage over hot copper and through activated charcoal, for example. Maintain a temperature of about 508° C. and a space velocity of about 200, based on methane. (The space velocity is the volume of gas flowing under standard conditions of temperature and pressure per unit volume of catalyst per hour.) The issuing gases should contain no more than about 2% of carbon monoxide (dry basis) and have a composition corresponding to a methane conversion of about 90%. Throughout the operation all catalyst poisons should be excluded.

Various changes may be made in the details of the method hereinbefore described, without departing from the invention or sacrificing any of the advantages thereof.

What is claimed is:

1. A process of manufacturing hydrogen, which comprises causing methane and steam to react in the presence of a catalyst at a temperature below 700° C. and with a volume ratio of steam to methane within the range 3.5:1 to 44:1 and at substantially a minimum value for the temperature employed and for a predetermined methane conversion and carbon monoxide content of the resulting gases.

2. A process of manufacturing hydrogen, which comprises causing methane and steam to react in the presence of a catalyst at a temperature within the range of 400° to 700° C. and with a volume ratio of steam to methane within the range 3.5:1 to 44:1 and at substantially a minimum value for the temperature employed and for a predetermined methane conversion and carbon monoxide content of the resulting gases.

3. A process of manufacturing hydrogen, which comprises causing methane and steam to react in the presence of a catalyst at a temperature within the range of 400° to 700° C. and with a volume ratio of steam to methane in excess of about 3.5:1.

4. A process of manufacturing hydrogen, which comprises causing methane and steam to react in the presence of a catalyst at a temperature within the range of 400° to 700° C. and with a volume ratio of steam to methane of from about 3.5:1 to about 44:1.

5. A process of manufacturing hydrogen, which comprises causing methane and steam to react in the presence of a catalyst at a temperature within the range of 400° to 700° C. and with a volume ratio of steam to methane in excess of about 6:1.

6. A process of manufacturing hydrogen, which comprises causing methane and steam to react in the presence of a catalyst at a temperature within the range of 400° to 700° C. and with a volume ratio of steam to methane in excess of about 9:1.

In testimony whereof I affix my signature.

ROBERTA L. BLAKE.
*Administratrix of the Estate of Frank C. Blake, deceased.*

CERTIFICATE OF CORRECTION.

Patent No. 1,713,325. Granted May 14, 1929, to

ROBERTA L. BLAKE, Administratrix of FRANK C. BLAKE, deceased.

It is hereby certified that error appears in the printed specification of the above numbered patent requiring correction as follows: Page 2, line 86, after the word "be" insert the word "no"; and that the said Letters Patent should be read with this correction therein that the same may conform to the record of the case in the Patent Office.

Signed and sealed this 11th day of June, A. D. 1929.

(Seal)

M. J. Moore,
Acting Commissioner of Patents.